United States Patent [19]

Liang et al.

[11] Patent Number: 6,100,317

[45] Date of Patent: Aug. 8, 2000

[54] STABILIZED BITUMEN COMPOSITIONS

[75] Inventors: Zhi-zhong Liang, Scarborough; Raymond T. Woodhams; James W. Smith, both of Toronto, all of Canada

[73] Assignee: Polyphalt L.L.C., Salt Lake City, Utah

[21] Appl. No.: 08/530,102

[22] PCT Filed: Mar. 28, 1994

[86] PCT No.: PCT/CA94/00174

§ 371 Date: Aug. 13, 1996

§ 102(e) Date: Aug. 13, 1996

[87] PCT Pub. No.: WO94/22957

PCT Pub. Date: Oct. 13, 1994

[30] Foreign Application Priority Data

Mar. 29, 1993 [GB] United Kingdom .................. 9306517

[51] Int. Cl.$^7$ ...................................................... C08L 95/00
[52] U.S. Cl. ................................ 524/69; 524/68; 524/59; 525/54.5
[58] Field of Search .................... 524/69, 68, 59; 525/54.5

[56] References Cited

U.S. PATENT DOCUMENTS

| | | | |
|---|---|---|---|
| 4,282,127 | 8/1981 | Desgouilles | 428/491 |
| 5,278,207 | 1/1994 | Kluttz | 524/68 |
| 5,280,064 | 1/1994 | Hesp et al. | 524/59 |

FOREIGN PATENT DOCUMENTS

| | | |
|---|---|---|
| 0 009 432 | 4/1980 | European Pat. Off. . |
| 0 162 561 | 11/1985 | European Pat. Off. . |
| 0 300 284 | 1/1989 | European Pat. Off. . |
| 0 321 189 | 6/1989 | European Pat. Off. . |
| 2 364 961 | 4/1978 | France . |
| WO 93/07219 | 4/1993 | WIPO . |

*Primary Examiner*—James J. Seidleck
*Assistant Examiner*—Olga Asinovsky
*Attorney, Agent, or Firm*—Sim & McBurney

[57] ABSTRACT

Two or more different polymeric materials are stably incorporated into bitumen by effecting steric stabilization of a polyolefin, such as polyethylene, and by dispersing the other polymer, such as a styrene-butadiene-styrene copolymer, an ethylene-vinyl acetate copolymer or an EPDM copolymer in the stabilized polyethylene-bitumen composition. The ability to incorporate different polymeric materials in bitumen permits desirable modifications to the properties of the composition to be effected. In addition, different properties can be attained by modifying processing parameters.

10 Claims, No Drawings

STABILIZED BITUMEN COMPOSITIONS

REFERENCE TO RELATED APPLICATIONS

This application is a U.S. National Phase filing under 35 USC 371 from PCT/CA94/00174 filed Mar. 28, 1994.

The present invention relates to the provision of stable dispersions of polymeric materials in bitumen for a variety of applications and methods of producing the same.

BACKGROUND TO THE INVENTION

The combination of two or more polymer types into bitumen is considered desirable from the standpoint of obtaining improvements in properties that may not be possible with a single modifier. By providing a blend of the two or more types of polymers, it is conceivable that improvement in properties can be achieved over a greater range of expected pavement-service conditions.

While this goal is highly desirable, heretofore it has been difficult to achieve this result because of the inherent incompatibility of bitumen and the polymeric materials to be incorporated therein. In addition, different polymers, which, when used independently, are compatible with the bitumen, in combination, interfere with the compatibility of each other and/or the final system.

Various procedures have been attempted to improve the compatibility of bitumen and polymers, for example, by the use of low molecular weight copolymers, process oils, and by the use of specific processing conditions to promote chemical reactions, such as cross-linking.

In International patent application no. WO 93/07219 (corresponding to U.S. Ser. No. 863,734 filed Apr. 6, 1992), assigned to The University of Toronto Innovations Foundation, there is described the stabilization of dispersed polyethylene and other olefin polymers in bitumen for imparting improved properties to such asphalt. The polyethylene is maintained in a dispersed state by using a steric stabilizer which is anchored to the dispersed particles and which is compatible with the liquid medium. Such an arrangement maintains the dispersed polyethylene particles spaced from each other in the bitumen, and inhibits separation of the particulate phase from the liquid phase by the progressive coalescence of dispersed particles.

In particular, a stable dispersion of polyolefin particles in bitumen may be formed by employing a functionalized diene rubber which is covalently bonded to a functionalized polyethylene, with or without liquid polybutadiene. Cross-linking of the unsaturated structure in the functionalized butadiene molecular chain to the bitumen forms an extended polybutadiene-based network with a partially cross-linked structure anchored to each of the polymer particles by compatibility of the functionalized polyethylene with the polymer particles and swollen by the bitumen phase, to provide a gel envelope about the polymer particles, which prevents coalescence of the polymer particles.

SUMMARY OF INVENTION

It has now been surprisingly found that a wide range of copolymers may be incorporated into the bitumen composition containing stabilized polyethylene or other polyolefin described in WO 93/07219 and such copolymer resists separation from the bitumen. The present invention, therefore, permits two or more different polymeric materials to be incorporated into bitumen and to remain stably dispersed therein.

Accordingly, in one aspect of the present invention, there is provided a bitumen composition, comprising bitumen, at least one polyolefin sterically stabilized in the bitumen, and at least one additional polymeric material stably incorporated into the composition.

These stable novel bituminous compositions permit improved performance and a versatility of formulation design which has not previously been possible, while also providing for compositions from which the polymer components do not separate.

In addition, it has been found that a wide variety of properties may be achieved, independent of the formulation utilized, depending on the sequence of addition of the polyolefin, copolymer and stabilizer to the bitumen and variations in other processing parameters, such as mixing time, temperature and rate of shear.

In accordance with a further aspect of the present invention, there is provided a method of forming a bituminous composition, which comprises dissolving a functionalized diene in a solvent which is bitumen or an oil compatible with bitumen, dispersing a functionalized polyolefin in the solvent, reacting the functionalized polyolefin and the functionalized diene so as to bind one end of the olefinic polymer to the diene, dispersing a polyolefin in a molten form in the solvent, dispersing at least one additional polymer in particulated form in the solvent to provide, in the bituminous composition, steric stabilization of the polyolefin by bonding of the free end of the functionalized polyolefin to the particulate polyolefin and stable incorporation of the at least one additional polymer by entanglement, physical entrapment, chemical cross-linking or a combination of two or more of such mechanisms, and where the solvent is oil compatible, dispersing the resultant composition in bitumen.

GENERAL DESCRIPTION OF INVENTION

The term "bitumen" used herein has its conventional technical meaning and means a class of black or dark-colored (solid, semi-solid or viscous) cementitious substances, natural or manufactured, composed principally of high molecule weight hydrocarbons of which asphalts, tars, pitches and asphaltites are typical. The term "asphalt" as used herein has its conventional technical meaning and means a dark, brown to black, cementitious material, solid or semi-solid in consistency, in which the predominant constituents are bitumen that occur in nature, as such, or are obtained as residue in petroleum refining. The bituminous material employed herein may arise from a variety of sources, including straight and vacuum residue, mixtures of vacuum tower wash oil, paraffin distillate and aromatic and naphthenic oils. Other asphaltic materials, such as rock asphalt, naturally-occurring asphalt and coal tar pitch, also may be used.

As described above, the present invention enables two or more different forms of polymeric materials to be stably incorporated into bitumen in order to expand the useful temperature range of the bitumen composition. One polymer component of the composition comprises a polyolefin, which is preferably polyethylene, but may comprise other olefin homopolymers and copolymers of ethylene and other olefin monomers. Such polyolefin or mixture of two or more polyolefins, is stably incorporated into the bitumen in the form of a particulate phase dispersed in the bitumen by the mechanism of steric stabilization, as fully described in WO 93/07219, referred to above. As described therein, a bifunctional or bicompatible molecule is employed which has one component bonded to the polyolefin and another component soluble in the bitumen.

As described in WO 93/07219, the polyolefin component of the composition preferably comprises polyethylene. Such polyethylene may comprise low density, linear low density or high density polyethylenes and may comprise polyethylene blends, such as are obtained in pelletized, flaked or powdered recycled material. In general, dispersion of the polyolefin component is effected with the bitumen above the melting point of the polyolefin, generally from about 100° to about 250° C., preferably about 130° to about 200° C., for a time sufficient to form a stable composition, which may be about 0.1 to about 3.5 hours, usually about 0.25 to about 1 hour.

One or more additional polymers are incorporated into such composition. Such polymers are generally copolymers and may contain residual unsaturation. Such copolymers are often incompatible with bitumen and hence normally separate or coalesce rapidly when stirring of the composition is stopped. However, in accordance with the invention, when such copolymers are incorporated into the stabilized polyolefin compositions, they become stabilized and resist separation from the bitumen. Some copolymers which can be employed herein are already somewhat compatible with bitumen or can be rendered so by suitable processing. The presence of the dispersed polyethylene phase in bituminous compositions comprising such materials at worst does not destabilize such materials and frequently may improve such stability.

The manner in which the copolymers become stabilized in the composition depends on the nature of the polymer employed, and may include entanglement, physical entrapment, chemical cross-linking or combinations of two or more of such mechanisms.

Copolymers which may be incorporated into the bituminous compositions according to the invention include elastomeric copolymer, including:

styrenic copolymers, such as styrene-butadiene rubber (SBR), styrene-butadiene-styrene block copolymers (SBS), styrene-ethylene-butadiene-styrene block copolymers (SEBS) and styrene-isoprene-styrene block copolymers (SIS);

olefinic copolymers, such as polypropylene copolymers, ethylene-vinyl acetate copolymers (EVA), ethylene methylacrate copolymers (EMA) and ethylene propylene diene copolymers (EPDM).

other polymers, such as nitrile-butadiene rubber (NBR), polyvinylchloride (PVC), polyisobutene, and polybutadiene (PB).

Mixtures of two or more of such polymers may be incorporated into the bituminous compositions along with the polyolefin. The compositions of the invention may but do not necessarily employ components, such as process oils, which render the polymers more compatible with the bitumen.

In general, the choice of the polymer to be incorporated into the bitumen is influenced by the following parameters, as well as possibly others:

the asphalt chemical composition
the molecular weight of the asphalt
the molecular weight of the polymer(s)
the shear force applied during mixing of the components
the ratio of constituents of the copolymer, such as the mole ratio of E:VA in EVA The polymeric materials may be present in the bitumen composition in the form of particle dispersions, strand-like dispersions, solutions and combinations in which the (co)polymer(s) is stabilized against separation.

In general, at low polymer loadings, the bitumen comprises a continuous phase in which the polymer is dispersed. However, at higher polymer loadings, a phase inversion may occur, whereby the polymer becomes the continuous phase.

One effect which has been observed in connection with the compositions of the invention is that, by employing such copolymers in conjunction with the stabilization system described in WO 93/07219, a decreased amount of copolymer material is required to achieve comparable modification to the properties of the bitumen. For example, about 2.5 wt. % of SBS is sufficient to provide the same elastic recovery as bitumen not having the stabilization system hereof to which about 4 wt. % SBS is added, thereby achieving a considerable cost saving with respect to the copolymeric component.

In addition, as can be seen from the specific Examples below, it has been found that the viscosity and other properties of the modified bitumen can be varied for the same or essentially the same quantities of the same components, depending on the order of mixing of the components in formation of the bitumen composition. The compositions of the present invention may be utilized in a wide variety of applications as a result of the diversity of properties achieved by employing different compositional components and mode of formation.

The various alternative procedures of order of mixing and composition of components may be employed with other copolymer components as well as when such copolymer components are omitted and/or when polyethylene is omitted, for example, where two or more copolymers are stabilized.

Rather than form a concentrate in bitumen as described above, a concentrate may be formed in oil or other medium and the concentrate in this form may be introduced to the bitumen, along with the polymer and/or copolymer components.

Within the context of this invention, the manner by which the final dispersion is achieved varies according to the nature of the copolymers and/or homopolymers and the process conditions employed. Depending on the application to which the bitumen composition of the invention is to be put, the quantities of polyolefin and of copolymer incorporated into the bitumen may be varied widely. Preferably, the amount of polyethylene, when present in the composition, may vary from about 0.5 to about 20 wt. % while that for the copolymer, when present in the composition, may vary from about 0.5 to about 20 wt. %. For example, with SBR and SBS copolymers, added to impart elasticity, the amount of copolymer employed may range from about 1 to about 15 wt. %.

In addition to these components, there may also be incorporated into the bituminous composition or dispersed phase comprising dissociated rubber vulcanate network, particularly prepared from scrap crumb rubber, such as automobile tyre crumb rubber, as fully described in International application PCT/CA93/00562 filed Dec. 29, 1993, in the joint names of ourselves and University of Toronto Innovations Foundation.

The stabilized bitumen compositions of the present invention also may be incorporated into other systems. For example, the stabilized bitumen compositions may be incorporated into the manufacture of rubber and plastic compounded compositions, such as in an amount of about 5 to about 50 wt. %. Alternatively, the stabilized bitumen compositions may be provided in the form of emulsions, with the continuous phase being aqueous or organic. Masterbatch compositions comprising bitumen and stabilized polymers may be compounded with fillers and/or polymers and the compounded composition may be pelletized to produce a pelletized composition for subsequent incorporation into compositions for a variety of industrial uses. The compositions described herein may be utilized in a variety of asphalt applications, including all types of paving, preformed paving bricks, roofing membranes, shingles, waterproofing membranes, sealants, caulks, potting resins and protective finishes.

In one embodiment of the invention f or dispersion of the polyethylene, maleinized polyethylene, liquid polybutadiene (as required), amino-terminated poly (butadiene-co-acrylonitrile) or amino-terminated polybutadiene and elemental sulfur may be dispersed in bitumen. For a conventional hot mix asphalt paving application, a preferred ratio of maleinized polyethylene to bitumen is from about 0. 05 to about 10 percent by weight, more preferably, from about 0.5 to about 2 percent by weight, and a preferred ratio of amino-functionalized butadiene based copolymer is from about 0.01 wt. % to about 3 wt. %, more preferably about 0.05 to about 2 wt. % The amount of liquid butadiene may be. preferably in the range of about 0.02 to about 15 wt. %, more preferably from about 0. 1 to about 6 wt. %, of bitumen. The amount of sulfur is preferably between about 0.05 percent and about 10 percent of the total mixture, by weight, preferably about 0.1 to about 5 wt. %. For other application, for example, roofing, the relative proportions and total amounts of components may vary.

Paving materials generally include aggregate, such as crushed stone pebbles and sand, along with the bitumen composition. Similarly, other additives to the bitumen composition may be employed, dependent on the end use to which the bituminous composition is put. For example, a roofing material may be obtained by the addition of suitable fillers, such as asbestos, carbonates, silica, wood fibres, mica, sulfates, clays, pigments and/or fire retardants, such as chlorinated waxes. For crack-filler applications, an oxide may be advantageously added.

EXAMPLES

In the Examples which follow, the stability of the polymer modified binders during hot storage was evaluated based on (i) the results of observation under an optical microscope equipped with temperature controlled hot stage to observe the difference in morphology of samples, and/or (ii) separation testing of conditioned asphalt samples. The conditioning procedure consists of placing approximately 50 grams of polymer-asphalt binder in 2 cm (¾") copper tubes and storing such tubes in a vertical position at 160° C. in an oven for 2 to 3 days. Following hot storage a viscosity ratio was determined by comparing the viscosity of the binder from the top section of the tube with the binder from the bottom section of the tube. Ratios in the range of 0.80 to 1.20 are generally considered indicative of acceptable stability.

Example 1

This Example illustrates the incorporation of copolymeric materials into bitumen compositions.

Compositions were prepared by a two-step procedure, in which a concentrate first was formed and then the concentrate was diluted with asphalt and adding, while stirring, polymer to be stabilized. In this Example, the asphalt employed was Lloydminster, Penetration 85/100.

The concentrate was prepared by dispersing functionalized polyethylene (Fusabond E-110, MI=40, anhydride content: 0.08 g mole/Kg of resin) in asphalt at 170° C. for 10 minutes, adding a mixture of amine-terminated poly (butadiene-co-acrylonitrile) copolymer (liquid, acrylonitrile content 10%, amine equiv. at 1200) and polybutadiene (Ricon 134, MW=12,000) while mixing for 15 minutes at 180° C., and adding sulfur while mixing the asphalt for 1.5 hours at 190° C. to 200° C. The resulting concentrate then was diluted with the same asphalt to form a homogenous binder to which was added polyethylene (PE) (low density, melt flow index=5) to be stabilized.

Various polymers then were added to the resulting composition in the following manner:

SBS (S:B=30/70, MW=350,000, Mn=140,000): disperse SBS in asphalt composition 190° C. for 30 minutes and at 200° to 240° C. for a further 30 minutes.

EVA (Cil 1240A, VA=12% by weight, melt flow index= 10): disperse EVA in asphalt composition at 180° C. for 30 minutes.

EPDM (Royalene 552, EP ratio 75/25, Morney viscosity ML 1+4 at 125° C.=50): disperse EPDM in asphalt composition at 200° C. for one hour.

EP/PP (recycled diaper waste-PE/PP ratio 60:40 (comingled blend): disperse EP/PP in asphalt composition at 170° C. for 1 hour Mixing in all Examples was effected in a Brinkman Polytron homogenizer(Model PT45/80) mixer.

Details of the compositions formed in a series of experiments are set forth in Table I below. In these various experiments, the "c" experiments are control experiments, the "a" experiments are examples of compositions according to the present invention and the "b" experiments are examples of compositions according to WO 93/07219.

The various samples were subjected to testing and the results obtained are set forth in Table II below. As may be seen from these results, the SBS was processed under conditions in which it was relatively stably introduced to the asphalt (Experiment 1(c)) and the presence of the stabilizer alone (Experiment 1(b)) and stabilizer and polyethylene (Experiment 1(a)) did not adversely affect such stability.

In the case of EVA, in the absence of stabilizer, the copolymer readily coalesced and separated from the asphalt (Experiment 2(c)). With stabilizer alone (Experiment 2(b)) and stabilizer and polyethylene (Experiment 2(a)), the EVA was stably incorporated into the composition and did not tend to coalesce or separate from the asphalt, as evidenced by visual observation and as can be seen from the viscosity ratio following conditioning. For EPDM, similar results were obtained as for EVA. The EPDM was more difficult to disperse in the asphalt than EVA, and hence the conditions employed for dispersion were slightly modified. In the case of the comingled blend of EP/PP (60:40 with about 1.0% $TiO_2$), the blend was stably incorporated into the bitumen (Experiment 4(a)) while, in the absence of stabilizer, the dispersed polymers (PE and PP) rapidly coalesced when agitation was stopped.

Example 2

This Example illustrates the addition of polyethylene and SBS to unmodified asphalt.

In a 1 liter mixing vessel, 92 parts of asphalt (Caltex Class 170, penetration at 25° C.=85 dmm, Viscosity at 135° C.=0.32 pa.s., Ring and Ball Softening point=45° C.) were heated to 180° C. Then, 5 parts of polyethylene (PE, low density, melt flow index=5) and 3 parts of styrene-butadiene-styrene (SBS S:B-30/70, Mw=350,000, Mn=140,000) were added respectively and dispersed into the hot liquid asphalt for 60 minutes. After mixing was stopped, the PE dispersed droplets and SES dispersed phase rapidly coalesced respectively in the hot liquid asphalt. Both PE and SES migrated towards the surface of the liquid asphalt during 24 hr hot storage at 180° C. to form a viscous polymer layer. This lack of stability against gross phase separation is typical of polyolefin and styrenic copolymer dispersions in hot liquid asphalt. Polyethylene and SBS tend to coalesce without any synergistic assistance to each other to prevent such phase separation.

Example 3

This Example comprises Examples A-1, A-2 and A-3, B-1 and B-2 (Table III), and illustrates the results obtained when SBS is incorporated into asphalt under different processing conditions. As may be seen from the results below, at equivalent levels of SBS and PE, vastly differing results can be obtained.

Example A-1

0.5 part of maleinized polyethylene was dispersed in 18.2 parts of asphalt (Caltex Class 170) at about 170° C. for 10 min. Following this, 0.7 part of polybutadiene and 0.4 part of an amine terminated poly(butadiene-co-acrylonitrile) copolymer (ATBN) were added and mixed at around 180° C. for 25 mins, then, 0.6 part of sulfur was blended in for 15 min. To this stirred mixture, was added 71.7 parts of asphalt for dilution and further mixing for 50 min. Finally, recycled low density polyethylene (RLDPE) and SBS elastomers were added in sequence and mixed under high shear at about 200° C. for 35 min (for RLDPE) and for 25 min (for SBS) respectively, forming a bituminous composition wherein polymer components were stabilized against phase separation. The performance was evaluated and shown in Table III.

Example A-2

The procedure of Example A-2 was repeated with a different sequence of addition of the additives to asphalt to form the same final composition with a controlled mixing time of 160 min. Using the same materials as in Example A-1, 0.5 part of maleinized polyethylene, 0.7 part of the polybutadiene and 0.4 part of the amine terminated poly (butadiene-co-acrylonitrile) copolymer were dispersed in 18.2 parts of asphalt for 35 min. 0.2 part of sulfur was added to the mixture and mixed at about 190° C. for 40 min. Then, 71.7 parts of asphalt was added for 5 min. dilution. After that, 5 parts of RLDPE with 0.4 part of sulfur was added and dispersed at around 200° C. for 60 min. followed by the addition and mixing of 3 parts of SBS for further 20 min to obtain a stabilized bituminous composition. The evaluation result was shown in Table III.

Example A-3

Using the same materials as in Example A-1, after 0.5 part of the maleinized polyethylene, 0.7 part of the polybutadiene and 0.4 part of the amine functionalized poly(butadiene-co-acrylonitrile) copolymer were dispersed in 18.2 parts of asphalt for 35 min, 74.7 parts of asphalt which had been preblended with 4% of SBS at around 180° C. for 30 min. was used to dilute the mixture for 5 min. Then, 0.6 part of sulfur was added and reacted at about 200° C. for 70 min and 3 parts of RLDPE was mixed into the mixture for further 20 min to produce a stabilized polymer-bitumen composition. The evaluation on this product is given in Table III.

Example B-1

Using the same materials as in Example A-1, asphalt (92.5% by wt) was preblended with the maleinized polyethylene (2.5% by wt), the polybutadiene (3.7% by wt) and amine terminated poly(butadiene-co-acrylonitrile) (1.3% by wt) copolymer at around 180° C. for 40 min. The preblend was added, while stirring, to the same amount of asphalt which had been treated with 3% by weight of sulfur. Then, 20.2 parts of the resultant mixture was diluted with 71.8 parts of asphalt for 10 min. Finally, 5 parts of RLDPE and 3 parts of SBS were added in order and dispersed at about 185° C. for 60 min to produce a stabilized polymer-bitumen composition. The evaluation result is shown in Table III.

Example B-2

Using the same materials as in Example B-1, 10.1 parts of the preblend was mixed with the same amount (10.1 parts) of asphalt which had been treated with 4% (by wt) of sulfur, then the mixture was diluted and mixed with 71.8 parts of asphalt for 5 min. Finally, 5 parts of RLDPE followed by 3 parts of SBS was added and dispersed under a high shear for 120 min at about 190° C., to produce a stabilized polymer-bitumen composition.

SUMMARY OF DISCLOSURE

In summary of this disclosure, the present invention provides modified stabilized bituminous compositions in which copolymers and/or homopolymers are stably incorporated to modify the properties of the bitumen composition. Modifications are possible within the scope of this invention.

TABLE I

| | | designation | | | | | | | | | |
|---|---|---|---|---|---|---|---|---|---|---|---|
| | | SBS | | | EVA | | | EPDM | | | Comingled PE/PP |
| Ingredient phr | | 1a | 1b | 1c | 2a | 2b | 2c | 3a | 3b | 3c | 4a | 4c |
| SBS | | 2 | 2 | 2 | — | — | — | — | — | — | | |
| EVA | | — | — | — | 2 | 2 | 2 | — | — | — | | |
| EPDM | | — | — | — | — | — | — | 2 | 2 | 2 | | |
| PE/PP | | — | — | — | — | — | — | — | — | — | 3 | 3 |
| PE | | 2 | — | — | 2 | — | — | 2 | — | — | | |
| AC-Lloyd-minster 85/100 | | 94.4 | 86.36 | 98 | 92.80 | 94.73 | 98 | 92.80 | 94.73 | 98.0 | 94.6 | 97 |
| FPE | | 0.48 | 0.49 | — | 0.96 | 0.98 | — | 0.96 | 0.98 | — | 0.7 | — |
| ATBN | | 0.32 | 0.33 | — | 0.64 | 0.65 | — | 0.64 | 0.65 | — | 0.5 | — |
| LPBD | | 0.64 | 0.65 | — | 1.28 | 1.31 | — | 1.28 | 1.31 | — | 1.0 | — |
| Sulfur | | 0.16 | 0.17 | — | 0.32 | 0.33 | — | 0.32 | 0.33 | — | 0.2 | — |

TABLE II

| | | SAMPLE BEFORE STORAGE | | | SAMPLE AFTER STORAGE | | | |
|---|---|---|---|---|---|---|---|---|
| SAMPLES | Copolymer | Penetration (dmm @ 25° C.) | Viscosity (cp @ 135° C.) | S.P. (R&B ° C.) | Storage Period (hrs) | Viscosity at top ($V_t$) (cp @ 135° C.) | Viscosity at bottom ($V_b$) (cp @ 135° C.) | Viscosity Ratio ($V_t/V_b$) |
| control | | 90 | 550 | 45 | | | | |
| 1a | SBS | 47 | 3650 | 63 | 48 | 4600 | 4800 | 0.96 |
| 1b | SBS | 43 | 2750 | 65 | 48 | 2025 | 2075 | 0.98 |
| 1c | SBS | 67 | 1900 | 59 | 48 | 1550 | 1550 | 1.00 |
| 2a | EVA | 62 | 3100 | 58 | 72 | 2700 | 2785 | 0.97 |
| 2b | EVA | 65 | 2400 | 56 | 72 | 1875 | 1925 | 0.97 |
| 2c | EVA | 74 | 1000 | 52 | 72 | 1550 | 825 | 1.88 |
| 3a | EPDM | 59 | 4225 | 59 | 48 | 3550 | 3650 | 0.97 |
| 3b | EPDM | 55 | 2600 | 52 | 48 | 2225 | 2225 | 1.00 |
| 3c | EPDM | 73 | 950 | 50 | 48 | 1250 | 750 | 1.60 |
| 4a | PE/PP | 70 | 2025 | 55 | 48 | 1900 | 1700 | 1.12 |
| 4c | PE/PP | 65 | 1050 | 54 | 48 | 1075 | 800 | 1.34 |

TABLE III

| | Example 2 | | | | |
|---|---|---|---|---|---|
| | Group A | | | Group B | |
| Component, phr | A-1 | A-2 | A-3 | B-1 | B-2 |
| Asphalt | 89.9 | 89.9 | 89.9 | 90.7 | 90.7 |
| Fusabond E-110 | 0.5 | 0.5 | 0.5 | 0.3 | 0.3 |
| LPBD | 0.7 | 0.7 | 0.7 | 0.4 | 0.4 |
| ATBN | 0.4 | 0.4 | 0.4 | 0.3 | 0.3 |
| Sulfur | 0.6 | 0.6 | 0.6 | 0.3 | 0.4 |
| SBS | 3.0 | 3.0 | 3.0 | 3.0 | 3.0 |
| PE | 5.0 | 5.0 | 5.0 | 5.0 | 5.0 |
| Performance | | | | | |
| Penetration dmm at 25° C. | 40 | 38 | 26 | 23 | 5 |
| Torsoral Recovery % at 25° C. | — | — | — | 9 | —* |
| Viscosity Pa.s. at 135° C. | 9.4 | 7.5 | 11.4 | 3.75 | 4.4# |
| Softening Point (R&B) (° C.) | 74 | 77 | 75 | 67.3 | 91.5 |
| Elastic Recovery Pa.s. at 60° C. | — | — | — | 11.3 | 53.6 |
| Viscosity Pa.s. at 60° C. | — | — | — | 5,055 | 181,900 |

*too rigid at 25° C. to be tested.
# = test at 165° C.

What is claimed is:

1. A bituminous composition comprising:
   bitumen,
   at least one first polyolefin sterically stabilized in dispersed particulate form in the bitumen by a bicompatible molecule comprising a bitumen-compatible polymer interlinked with a second polyolefin, said second polyolefin being bonded to said at least one first polyolefin, and at least one additional elastomeric polymeric material which is a styrenic copolymer or an olefinic copolymer and which is stably incorporated into the bitumen by entanglement, physical entrapment, chemical cross-linking or a combination of two or more of such mechanisms.

2. The composition of claim 1 wherein said at least one first polyolefin is polyethylene.

3. The composition of claim 1 wherein said styrenic copolymer is an SBR, SBS, SEBS, or SIS copolymer.

4. The composition of claim 1 wherein said olefinic copolymer is an EVA, EMA, EPDM or polypropylene copolymer.

5. The composition of claim 2 wherein said polyethylene is present in said composition in an amount of from about 0.5 to about 20 wt. % and said elastomeric copolymer is present in said composition in an amount of from about 0.5 to about 20 wt. %.

6. A method of forming a bituminous composition, which comprises:
   dissolving a functionalized butadiene polymer having a first functional group at one end thereof and which is compatible with bitumen in a solvent which is bitumen or an oil soluble in bitumen,
   dispersing in said solvent a functionalized polyolefin having a second functional group at one end thereof capable of reacting with the first functional group,
   reacting said first and second functional groups so as to bind the one end of said functionalized polyolefin to the one end of said polybutadiene polymer to form a bicompatible molecule having a free polyolefinic end,
   dispersing a polyolefin in a molten particulate form in said solvent to provide in the bituminous composition, steric stabilization of said particulate polyolefin by bonding of the free polyolefinic end of the bicompatible molecule to said particulate polyolefin,
   dispersing at least one additional, elastomeric polymer which is a styrenic or an olefinic copolymer in said solvent to provide, in the bituminous composition, stable incorporation of the at least one additional polymer by entanglement, physical entrapment, chemical cross-linking or a combination of two or more of such mechanisms, and
   where said solvent is oil soluble in bitumen, dispersing the resultant composition in bitumen.

7. The method of claim 6 wherein said styrenic copolymer is an SBR, SBS, SEBS, or SIS copolymer.

8. The method of claim 6 wherein said olefinic copolymer is an EVA, EMA, EPDM or polypropylene copolymer.

9. The method of claim 6 wherein said dispersed particulate polyolefin is polyethylene which is present in said composition in an amount of from about 0.5 to about 20 wt. % and said additional elastomeric copolymer is present in said composition in an amount of from about 0.5 to about 20 wt. %.

10. The method of claim 6 wherein said additional, elastomeric copolymer is an SBS or SBR copolymer present in an amount of about 1 to about 15 wt. %.

* * * * *